Figure 1:
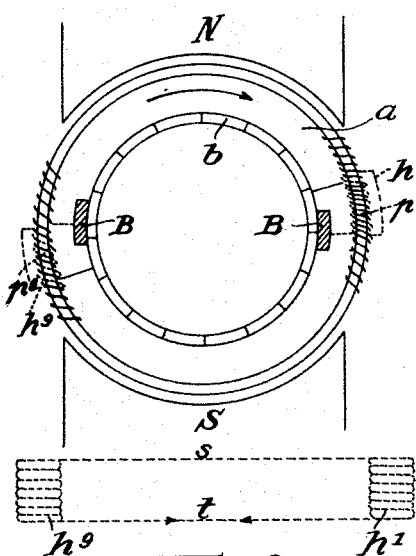

May 26, 1925.

U. CANTUTTI

SPARKLESS COMMUTATION

Filed June 5, 1923

1,539,241

Inventor
Ugo Cantutti
by Richards, Geier
Attorney

Patented May 26, 1925.

1,539,241

UNITED STATES PATENT OFFICE.

UGO CANTUTTI, OF ROME, ITALY.

SPARKLESS COMMUTATION.

Application filed June 5, 1923. Serial No. 643,602.

*To all whom it may concern:*

Be it known that I, Ugo Cantutti, a subject of the King of Italy, and a resident of 51 Via Gino-Capponi, in the city of Rome, Italy, have invented certain new and useful Improvements in Sparkless Commutation, of which the following is a specification.

This invention has reference to sparkless commutating means and in particular to the elimination of the self-induction of the sections of the commutator windings to be commuted. In the present state of the art the commutation in all kinds of electric machinery with commutators is effected in accordance with the principle of Pacinotti by means of a rotating commutator comprising a plurality of insulated lamina connected in any suitable manner to the electric circuits of the machine, and upon which in the reversal zones of the currents firm sliding contacts or brushes are made to bear which are adapted to collect and conduct the currents away. The occurrence of the counteracting magnetic flux, the reaction of the armature, and the necessity to establish an electromotive force in the sections of winding of the armature subject to commutation, which is opposed to the force existing in the same section of winding before commutation, make it necessary to so adjust the brushes as to cause them to be situated in agreement with the actual field of commutation thereby avoiding the occurrence of sparks at the edges of the brushes themselves.

Various means have been suggested already to obtain satisfactory commutation, such as for instance the employment of auxiliary poles, the saturation of the magnet or inductor cores; the arrangement of compensation windings in the inductor, the varying of the air gap at the inducing pole extremities, the windings according to Sayer, and other equivalent means. All these suggestions, however, fail to duly regard the actual causes of the formation of sparks, that is to say, the self-induction of the sections of winding in the state of commutation. Even, provided it should be possible by the suggestions hereinbefore referred to to arrange the brushes in the theoretical zone of commutation, this procedure would entail a rather considerable loss of energy which would be entirely out of proportion to the yield of the machine. This consumption of force which either goes to waste or is not utilized is due to the fact that the law of the current existing in the section of winding to be commuted is not of the nature of a linear law, as should be required by the theory, in order to provide for a very perfect commutation.

In view of these facts in the process of my invention means are provided to accomplish a perfect commutation without sparking and without loss of energy, so as to produce an increased efficiency with electric commutating machines, and in such a manner as to suppress the high tensions or to utilize the same after the removal of the greatest difficulty heretofore experienced in this respect, and resulting from the presence of self-induction of the section of winding submitted to commutation. In accordance with my invention, moreover, there is the possibility of increasing the commutation and the efficiency of any existing electric collector machine by the simple alteration of the armature windings by combining such windings with the constructive arrangements according to the new process of this invention.

The fundamental idea upon which the process according to this invention is based, and which is for instance embodied in the arrangement and construction of the armature windings of the machine operating with a commutator is substantially as follows:—
If two wire loops are arranged relatively to each other in such a manner that the magnetic fluxes produced in these loops by the currents circulating through them are linked or coupled with each other, and if one of these loops constitutes a continuous closed electric circuit the variations of the linking flux of current produced in the other loop in consequence of the variations of current occurring according to any suitable law will induce an electromotive force in the closed loop, and thereby produce a current flowing in such loop.

The action of this useful current in the closed loop operates to produce a flux of current having the tendency of compensating the variable flow of current which has itself produced the current in the closed loop, provided the ohm-resistance of the two coils has been correctly selected, and provided their magnetic coupling is sufficiently strong, the self-induction of the primary loop, which is magnetically coupled to the closed secondary loop, may be substantially eliminated or compensated.

It follows from these considerations that by providing for a magnetic coupling of the section of armature winding submitted to commutation with a group of auxiliary windings which are closed on themselves, and which are free from electromotive forces induced by rotation, the said section of winding during the commutation may be considered as being free from self-induction in regard to the variation of the current with relation to its direction and intensity of current. Such groups of auxiliary windings closed on themselves, if mounted upon the armature, will therefore produce a complete commutation by substantially eliminating the self-induction in the sections of windings of the armature coupled with them at the moment of commutation. By arranging the groups of such auxiliary windings in pairs with relation to each other and alternating by 180 electric degrees, and by combining them in counter-flow connection, the electromotive forces induced by the rotation mutually compensate each other, but not those electromotive forces which are induced in the sections of armature windings linked thereto in consequence of the variations of the magnetic fluxes during the commutation.

A method of procedure of the kind referred to, and which may be employed both in connection with newly constructed commutator machines as well as with existing machinery, is always bound to require commutators with a plurality of equal pairs of lamina, which condition, however, cannot always be accomplished. It is necessary, moreover, to take care that during the time in which certain sections of windings, linked to one of the groups of the auxiliary windings, are submitted to commutation, other sections of winding which are arranged below another group of auxiliary windings connected to the group first referred to, are prevented from commutation. It is therefore always necessary with the arrangement of lamina in pairs to adjust the brushes, though only slightly in the theoretical zone of commutation.

Figure 2:
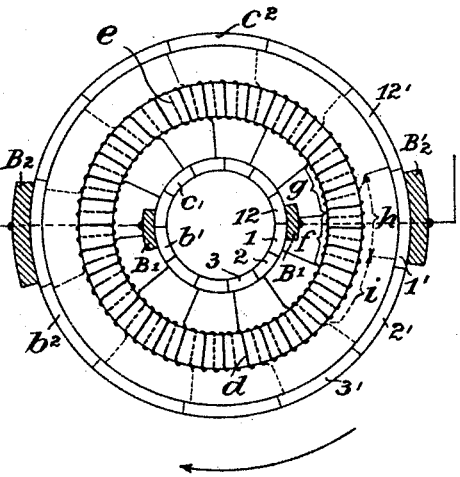
Figure 3:
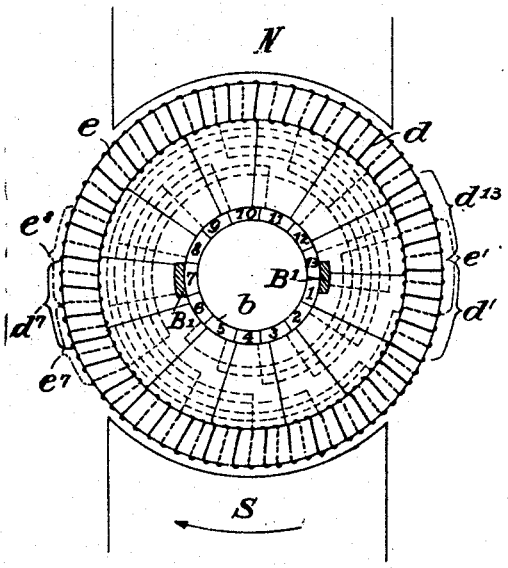
Figure 4:
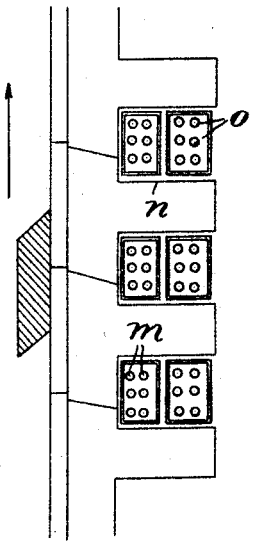

The invention will be more fully set forth with reference to the accompanying drawing showing several forms of the invention by way of example. In the drawing:—Figure 1 is a diagram of the electric connections according to my invention: Figure 2 illustrates an armature winding adapted for advantageously carrying out the principles of this invention. Figure 3 is a somewhat modified kind of armature winding; and Figure 4 is a construction of armature with a commutator $b$ for 18 segments or lamina.

In the construction according to Figure 1 the armature is indicated at $a$, and N and S are the magnet poles between which said armature rotates in the direction of the arrow shown in the drawing. Of the armature winding only the two coils $p'$ and $p''$ are shown which are in commutation, and are short-circuited by the brushes B. The coils of the sections of windings $p'$, $p''$ are magnetically linked to auxiliary windings $h'$ and $h''$ spaced apart 180 electric degrees relatively to each other, and the electric connection of which is indicated on the diagram below the figure, and in which the arrows $s$ and $t$ respectively indicate the direction of the electromotive forces induced by rotation under the magnetic poles in the zone preceding the commutation.

Arrangements of constructions of greater simplicity and which are of practical value and economical in operation, and which are adapted to serve for a perfect commutation combined with high efficiency of the machine and in the absence of sparking, and in which, moreover, the amount of lamina or commutator plates, as distinguished from the diagram below Figure 1, may be any number desired, will now be described:—

The armature winding according to Figure 2 shows, by way of example and for facilitating the illustration of the invention, a Gramme-ring. This ring is formed, instead of one single continuous winding, of two windings $d$ and $e$ each one of which is wound for continuous current and in the same direction, but above each other and separately from each other. The two windings are electrically connected to two different commutators $b'$ and $b^2$ in such a manner that the segments $c'$ of one commutator $b'$ are turned relatively to the segments $c^2$ of the other commutator $b^2$ through an angle $$\alpha = \frac{\pi}{N}$$

in which formula N is the number of segments or lamina of each commutator. In accordance therewith the connecting points of the two windings with the segments of the corresponding commutators are made on the periphery of the armature in angular distances equal to $\frac{\pi}{N}$. The brushes B', B' of one of the commutators are arranged in the same number and at the same angular distances as the brushes B², B'₂ of the other commutator $b^2$. The brushes of the two commutators are of the same polarity and of the same tension, are connected in parallel, and are all kept in the same commutating zone.

Assuming that the peripheral length of the contact surface of each brush upon the commutator is equal to the outer peripheral length of one of the commutator segments, which condition, however, is not required in practical operation, though it has been assumed in this specification merely for purposes of clearness of illustration, there will take place, during the commutation of a section of the winding of one of the two windings $d$, $e$, the short-circuiting of said section of winding in contact with two adjacent segments of the associated commutator. This short circuit takes place through the segments themselves and by means of the corresponding brush, and in part by way of the section of winding submitted to commutation, the number of sections of winding in this condition being always equal to the number of brushes of the commutator. It follows that the variations of the magnetic flux resulting from the rapid variations of the direction of current in any desired section of one of the windings that is leaving said short-circuit at the moment of commutation, produce the complete linking with a section of the other winding, partially arranged above the winding first referred to, and which in the same moment is short-circuited by way of two segments of the commutator and a brush, and which in consequence thereof operates in the same manner as the short-circuited secondary coil of a transformer with regard to the primary coil on submitting the latter to a change of current both in regard to the direction as well as regards the strength of the current. The short-circuited section of winding compensates the self-induction of the section of winding in commutation, and it thereby prevents all sparking between the brush and the commutator segment. This action, however, is dependent upon the condition that in the region where the commutation takes place the electromotive force induced by the rotation is sufficiently low, which effect takes place just at that time, when the brushes are situated in the neutral zone.

In Figure 2 of the drawing an armature with a two-pole ring and with two windings is shown which are wound in the same direction and are arranged opposite the commutators $b'$ and $b^2$. In the practical operation of this invention the two commutators $b'$ and $b^2$ are of the same size and symmetrically arranged with regard to the armature. In Figure 2 the commutator $b^2$ is shown outside of the armature for purposes of clearness of illustration. In the same manner the brushes $B'$ and $B^2$ are of equal size and of the same peripheral length as one of the associated segments of the commutator. The brushes shown at the right and left sides are connected in parallel, and may be replaced by one single brush, if necessary.

As soon as the section $i$ of the winding $e$ passes out of the short-circuit which is formed by the segments $2'$—$1'$ and by the brush $B'_2$ the section $f$ of the winding $d$ is short-circuited by the segments 1 and 12 and the brushes $B'$, and this short circuit is only broken, provided the armature continues to rotate in the direction of the arrow, after the section $h$ of the winding $e$ has already been short-circuited by the plates $1'$ and $12'$ and the brush $B'_2$. A similar procedure takes place at the same time in those windings which are subject to commutation and are under the two other brushes. This results in the elimination of the self-induction in those sections of windings of the armature which happen to be in the commuting position.

The number of winding sections of the armature may be any desired, and it is also possible in the construction of the arrangement of Figure 2 to so arrange the two commutators as to be in alinement, instead of shifted for a distance of an angle $\frac{\pi}{N}$ relatively to each other. The winding of the armature with two coils in the same direction, and the thereby resulting employment of two commutators may be of advantage in the case of commutator machines with very high potential and high current strength or high number of amperes. But the arrangement of the double commutators may be avoided without thereby sacrificing the advantages presented by the double winding by providing the arrangement hereinbefore described with the following modifications.

In the case of one single commutator the two windings, though also separately mounted upon the armature, are wound in magnetic opposition. The connection of the two windings with the segments of the commutator only one of which is used in that case, may be effected as with the ordinary continuous current armatures.

In Figure 3 of the drawing there is shown by way of example a two-pole ring armature composed of thirteen sections of windings. The winding $e$ indicated in dotted lines is wound in magnetic opposition to the winding $d$ shown in full lines. The section $e'$ of the winding $e$ is electrically connected with its ends to the segments 7 and 6 of the commutator $b$, to which segments are also connected the ends of the winding section $d^7$ of the winding $d$. Inasmuch as the ends of these two winding sections $e'$ and $d^7$ are always symmetrically arranged with relation to the axis of the magnet poles, short-circuiting currents are prevented from being set up between the two winding sections. Similar conditions prevail as regards the winding section $e^8$ in contact with the commutator segments 13 and 1, and as regards the winding section $d'$ which is likewise in contact with the plates 13 and 1 of the commutator.

As soon as the winding section $d'$ passes out of the short-circuiting circuit formed by the segments 12—13 and the brush $B'$, the section $e^8$ likewise passes out of said short-circuit. The variations of the magnetic flux resulting from the variations of current in said winding sections act upon the windings $c'$ and $a^7$ which are in short-circuit with the segments 7—6 and the brush B'. As soon as these sections pass out from the short-circuit thus formed, the variation of the magnetic flux corresponding thereto acts upon the sections $d^{13}$ and $e^7$ which are in short-circuit connection with the plates 12—13 and the brush B', and so on in succession. It is understood that all this time the two brushes are in the neutral zone.

The two forms of arrangements embodying my invention, hereintofore described may be employed directly in connection with a drum armature and in combination with any desired type of winding, such as for instance, series winding, parallel winding, series-parallel combination winding, undulatory winding, zig-zag winding, two pole winding, multiple pole winding and so on.

In the particular embodiment showing the arrangement with two commutators one of which is turned with relation to the other through an angle of $\frac{\pi}{N}$, and in which only one single winding section is mounted in each slot of the armature, and in which the first armature winding is arranged as in the case of an ordinary rotor for continuous current, the second winding should be superimposed, but separately and distinct therefrom, but with the same direction of winding. The connecting points of this last mentioned separate and distinct winding at the corresponding commutator are separated from those of the other winding on its corresponding commutator electrically by an angle $\frac{\pi}{N}$. Counting the conductor which happens to be in the neutral zone as the first element from the connecting points of the first winding N, the said conductor is situated just at the center of the corresponding section of the second winding, so that the entire magnetic flux of the inductor which traverses a winding section of one of the two windings, with the exception of the magnetic leakage, becomes completely linked with two windings sections of the other winding. By acting in this manner the new result is obtained that a winding section of one winding is always short-circuited during the commutation, as soon as a winding section of the other winding passes out from the short-circuit, in such a manner that the entire variation of the magnetic flux resulting from the variations of the current in the latter winding pursuant to the action of the commutation, becomes perfectly linked to the former winding.

In the detail view in Figure 4 it may be assumed that the useful part of each winding section of one of the windings is mounted in a single armature slot $n$, and that it consists of six conductors $m$. In the figure three successive grooves of rectangular shape are shown each of which contains two windings $m$ and $o$. The winding $m$ corresponds to the winding $d$ above mentioned, while the winding $o$ corresponds to winding $e$ above referred to. All the statements made above with reference to the winding sections $d$ and $e$ of Figure 2 at the moment of commutation may be repeated with reference to Figure 4. In the case of a single commutator the armature windings have to be arranged in the grooves as in the case of the arrangement of two commutators, but the direction of winding of one of them should be opposite to the direction of winding of the other. Besides, the extremities of the sections of each of the windings are to be connected with the segments of the commutator, which arrangement may be effected in the same manner as set forth with relation to a ring armature in accordance with Figure 3.

The invention has been shown and described herein only in its broad aspects, and without restricting it to any particular configuration or arrangement of parts, and it is by no means confined to the embodiments herein shown and described by way of example, but it is susceptible of a variety of modifications according to varying conditions of application, and without deviating from the spirit of my invention as expressed in the claim hereunto appended.

I claim:—

In a device for reducing commutation sparking in electric machinery, in combination, an armature, two electrically distinct, and oppositely wound, magnetically linked sectional windings on said armature, a commutator for said sectional windings, comprising a number of segments, the interlinked winding sections of said windings being connected to those commutator segments, arranged at a position of 180 electric degrees relatively to each other.

In testimony whereof I have signed my name to this specification.

Ing. UGO CANTUTTI.